US009866448B2

(12) United States Patent
Lai et al.

(10) Patent No.: US 9,866,448 B2
(45) Date of Patent: Jan. 9, 2018

(54) ELECTRONIC DEVICE AND METHOD FOR DNS PROCESSING

(71) Applicant: HTC Corporation, Taoyuan County (TW)

(72) Inventors: Yu-Chuan Lai, Taoyuan County (TW); Po-Fei Chen, Taoyuan County (TW); Zhi-Yuan Chen, Taoyuan County (TW)

(73) Assignee: HTC CORPORATION, Taoyuan County (TW)

( * ) Notice: Subject to any disclaimer, the term of this patent is extended or adjusted under 35 U.S.C. 154(b) by 251 days.

(21) Appl. No.: 13/759,071

(22) Filed: Feb. 5, 2013

(65) Prior Publication Data

US 2014/0082172 A1    Mar. 20, 2014

Related U.S. Application Data

(60) Provisional application No. 61/702,266, filed on Sep. 18, 2012.

(51) Int. Cl.
*G06F 15/16* (2006.01)
*H04L 12/24* (2006.01)
*H04L 29/12* (2006.01)

(52) U.S. Cl.
CPC .......... *H04L 41/50* (2013.01); *H04L 61/1511* (2013.01); *H04L 61/6009* (2013.01)

(58) Field of Classification Search
CPC ......... H04L 29/00; H04L 41/00; H04L 61/00; H04L 41/50; H04L 61/1511; H04L 61/009

USPC ................................................. 709/223, 228
See application file for complete search history.

(56) References Cited

U.S. PATENT DOCUMENTS

| 7,725,536 | B2 | 5/2010 | Douglis et al. | |
|---|---|---|---|---|
| 2004/0078487 | A1* | 4/2004 | Cernohous et al. | 709/245 |
| 2009/0070453 | A1* | 3/2009 | Douglis et al. | 709/223 |
| 2009/0222584 | A1* | 9/2009 | Josefsberg et al. | 709/245 |
| 2010/0293335 | A1* | 11/2010 | Muthiah et al. | 711/133 |
| 2010/0332680 | A1* | 12/2010 | Anderson et al. | 709/245 |
| 2011/0202793 | A1* | 8/2011 | Xu | 714/15 |
| 2012/0324094 | A1* | 12/2012 | Wyatt | H04W 4/003 709/224 |

OTHER PUBLICATIONS

"Standard Test Method for Use in the Evaluation of Message Communications Between Intelligent Electronic Devices in an Integrated Substation Protection, Control and Data Acquisition System," in IEEE Std C37.115-2003 , vol., no., pp. 1-82, Jun. 30, 2004.*

(Continued)

*Primary Examiner* — Christopher Biagini
*Assistant Examiner* — Messeret f Gebre
(74) *Attorney, Agent, or Firm* — JCIPRNet

(57) ABSTRACT

A method for DNS processing is provided. The method is executed by an electronic device and includes the following steps: determining a plurality of TTL values, wherein each of the TTL values corresponds to one of a plurality of operating states of the electronic device, and determining whether to remove an entry from a local DNS cache in the electronic device or not according to the TTL value corresponding to the current state among the operating states of the electronic device.

20 Claims, 3 Drawing Sheets

(56) References Cited

OTHER PUBLICATIONS

"A survey on content-centric technologies for the current Internet: CDN and P2P solutions", Passarella, Andrea, Computer Communications 35.1 (Jan. 1, 2012): 1-32.*
"Reducing DNS Caching", Bhatti, S.N. • Atkinson, 2011 IEEE Conference on Computer Communications Workshops (INFOCOM WKSHPS) (pp. 792-797.*
"Live Migration with Pass-through Device for Linux VM", Edwin Zhai, Gregory D. Cummings, and Yaozu Dong, 2008—pp. 261-267.*

* cited by examiner

ELECTRONIC DEVICE AND METHOD FOR DNS PROCESSING

CROSS-REFERENCE TO RELATED APPLICATION

This application claims the priority benefits of U.S. provisional application Ser. No. 61/702,266, filed on Sep. 18, 2012. The entirety of the above-mentioned patent application is hereby incorporated by reference herein and made a part of this specification.

BACKGROUND OF THE INVENTION

Field of the Invention

The present invention relates to a Domain Name System (DNS). More particularly, the present invention relates to an electronic device and a method for DNS processing.

Description of the Related Art

Current consumer electronic devices, such as smart phones, are capable of executing many applications in both foreground and background. These applications access Internet frequently. Before a smart phone can reach a remote server for the desired service, the smart phone must send a DNS query to a DNS server to get the IP address corresponding to the domain name of the remote server because Internet routing devices recognize IP addresses instead of domain names.

However, most of the DNS queries triggered from smart phones are repeated because many DNS cache timeout values (time-to-live values, TTL values) provided by DNS servers are too small. Repeated DNS queries consume extra power and time to get the answers from DNS servers.

SUMMARY OF THE INVENTION

Accordingly, the present invention is directed to a method and an electronic device for DNS processing. The method and the electronic device manage entries of the local DNS cache according to multiple TTL values including the original TTL value provided by a DNS server and extended TTL values based on the original TTL value. Due to the flexibility to extend the expiration time of DNS cache entries, results of DNS queries can be obtained from the local DNS cache more frequently, which saves more power for the electronic device.

According to an embodiment of the present invention, a method for DNS processing is provided. The method is executed by an electronic device and includes the following steps: determining a plurality of TTL values, wherein each of the TTL values corresponds to one of a plurality of operating states of the electronic device, and determining whether to remove an entry from a local DNS cache in the electronic device or not according to the TTL value corresponding to the current state among the operating states.

According to another embodiment of the present invention, an electronic device for DNS processing is provided. The electronic device includes a storage device storing a local DNS cache and a controller coupled to the storage device. The controller determines the aforementioned plurality of TTL values and determines whether to remove an entry from the local DNS cache or not according to the TTL value corresponding to the current state among the operating states of the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
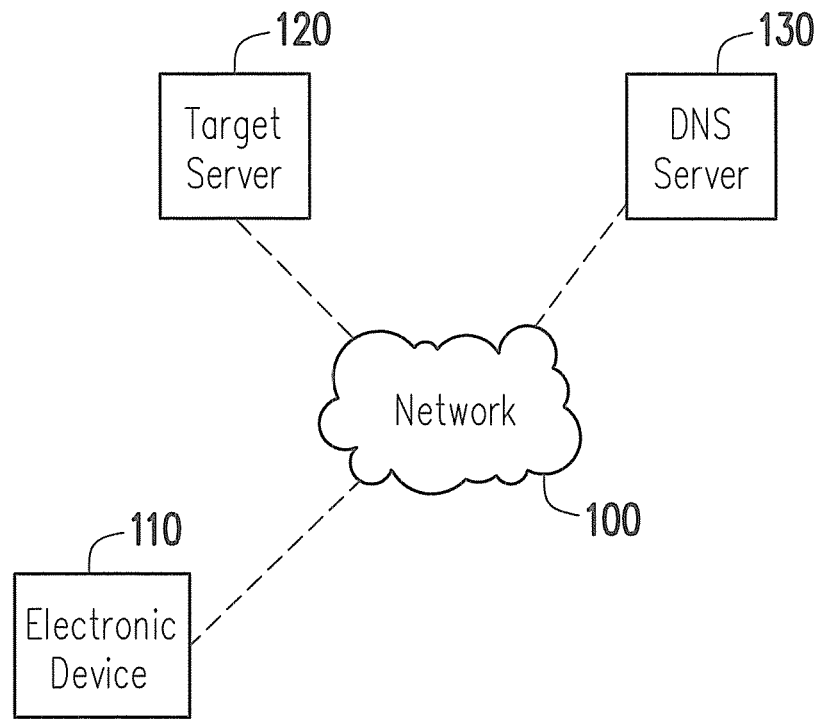
FIG. 1 is a schematic diagram showing an electronic device for DNS processing and related servers according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing an electronic device 110 for DNS processing and related servers 120 and 130 according to an embodiment of the present invention. A network 100 connects the electronic device 110, a target server 120 and a DNS server 130. The network 100 may be a wired network or a wireless network. The electronic device 110 may be any apparatus that is capable of executing an operating system, executing some applications in the operating system, and connecting to a network, such as a smart phone, a personal digital assistant, a tablet computer, a notebook computer, or a desktop computer.

An application in the electronic device 110 may send a request to the target server 120 for the service provided by the target server 120. Before sending the request, the electronic device 110 needs to send a DNS query to the DNS server 130 in order to translate the domain name of the target server 120 to the IP address of the target server 120 because routing devices such as switches and routers only recognize IP addresses. The electronic device 110 has a local DNS cache to reduce the frequency of sending DNS queries to the DNS server 130.

Figures 2A, 2B:
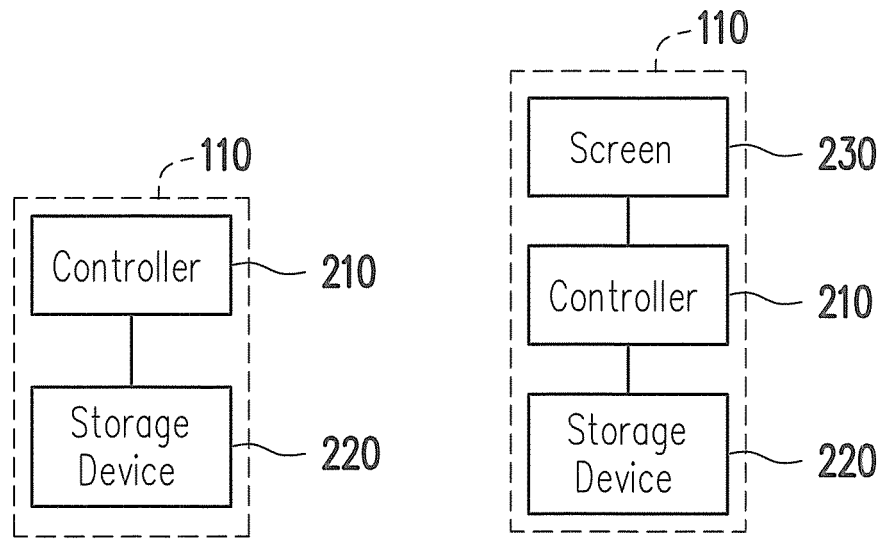
FIG. 2A and FIG. 2B are schematic diagrams showing electronic devices for DNS processing according to some embodiments of the present invention.

FIG. 2A is a schematic diagram showing the electronic device 110 according to an embodiment of the present invention. According to this embodiment, the electronic device 110 includes a storage device 220 storing the aforementioned local DNS cache and a controller 210 coupled to the storage device 220. The storage device 220 may be a memory, a hard disk, or a combination of memory and hard disk. The controller 210 may be a central processing unit (CPU), a processor, a microprocessor, or an embedded controller of the electronic device 110.

FIG. 2B is a schematic diagram showing the electronic device 110 according to another embodiment of the present invention. According to this embodiment, the electronic device 110 further includes a screen 230 coupled to the controller 210. The screen 230 may display the graphical user interface (GUI) of the operating system and the applications.

The controller 210 may determine a TTL value for each operating state of the electronic device 110. Typically, the electronic device 110 has a plurality of operating states. For example, the operating states may at least include one of a state defined by when the screen 230 is turned on, a state defined by when the screen 230 is turned off, a state defined by when the electronic device 110 does not receive any user operation in a predefined period of time, and a state defined by when the foreground application executed by the electronic device 110 does not need network connection. The first two operating states are related because they both involve with the screen 230. The controller 210 may determine a plurality of TTL values according to the various operating states of the electronic device 110. In addition, the controller 210 may determine whether to remove an entry from the local DNS cache or not according to the TTL value corresponding to the current state among the operating states. The details of the determination are discussed below.

Figure 3:
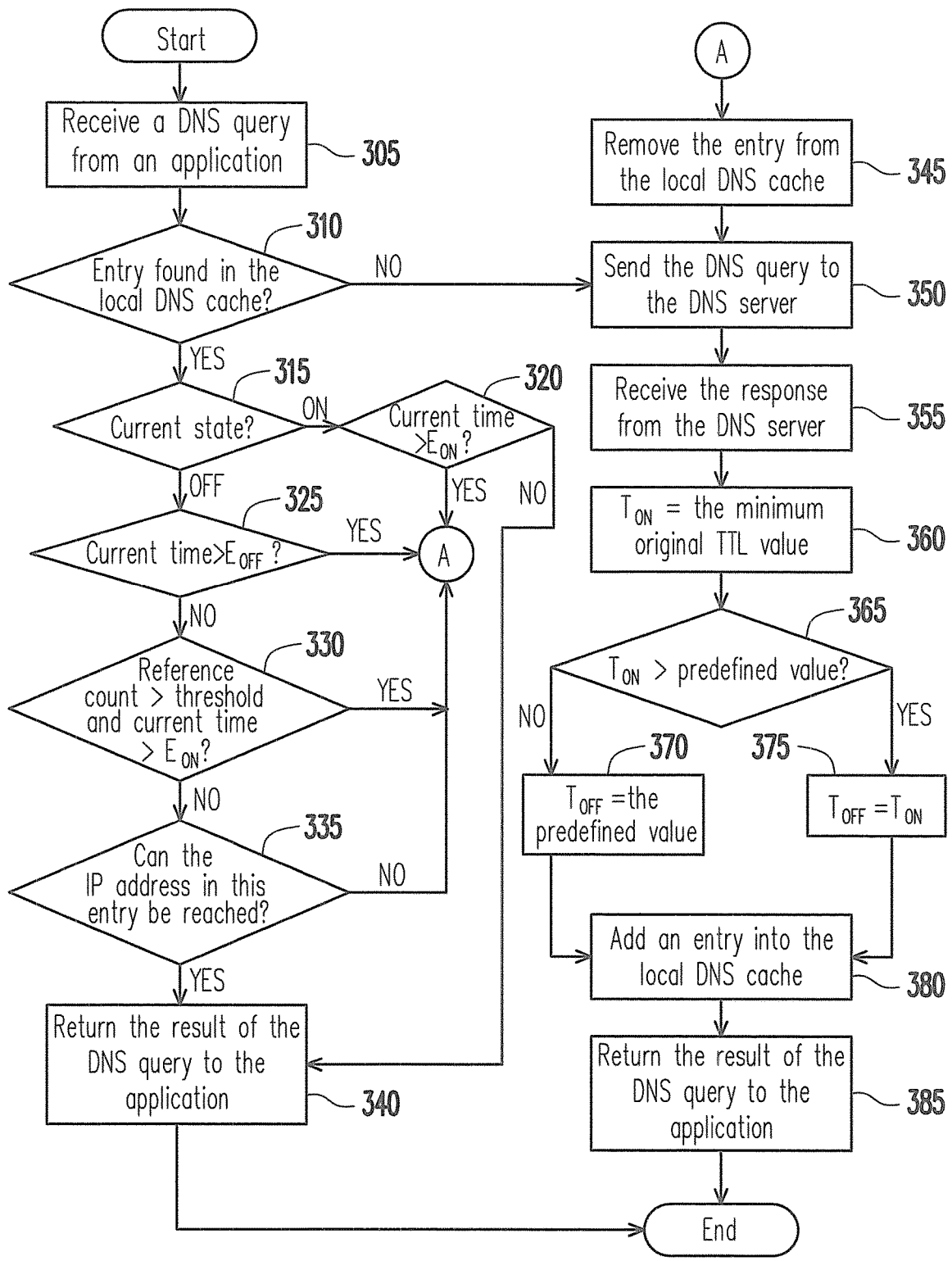
FIG. 3 and FIG. 4 are flow charts showing a method for DNS processing according to an embodiment of the present invention.

FIG. 3 is a flow chart showing a method for DNS processing according to an embodiment of the present invention. This method may be executed by the controller 210. According to this embodiment, the electronic device 110 has two operating states: a screen-on state defined by when the screen 230 is turned on and a screen-off state defined by when the screen 230 is turned off. Accordingly, the controller 210 determines two TTL values, $T_{ON}$ and $T_{OFF}$, corresponding to those two operating states.

First, in step 305, receive a DNS query from an application executed by the electronic device 110. In step 310, check whether an entry corresponding to the domain name of the query can be found in the local DNS cache or not. Assume the query is for an IP address of the target server 120 and this is the first query for that IP address. Consequently, there is no such an entry in the local DNS cache. The flow proceeds to step 350 to send a DNS query for an IP address corresponding to the domain name of the target server 120 to the DNS server 130. In step 355, receive the response to the DNS query from the DNS server 130.

Next, determine the TTL values $T_{ON}$ and $T_{OFF}$ based on the response provided by the DNS server 130. In step 360, set $T_{ON}$ to be the minimum value of the at least one original TTL value in the response. The response may include the IP address of the target server 120 and one or more original TTL values provided by the DNS server 130. The controller 210 sets $T_{ON}$ to be the original TTL value when there is only one original TTL value in the response. The controller 210 sets $T_{ON}$ to be the minimum original TTL value when there are multiple original TTL values in the response.

Next, determine $T_{OFF}$ based on $T_{ON}$. In step 365, check whether the TTL value $T_{ON}$ is smaller than or larger than a predefined value. When $T_{ON}$ is smaller than the predefined value, set the other TTL value $T_{OFF}$ to be the predefined value in step 370. In this way, $T_{ON}$ is the original TTL value, while $T_{OFF}$ is the extended TTL value. When $T_{ON}$ is larger than the predefined value, set $T_{OFF}$ to be $T_{ON}$.

In step 380, add an entry into the local DNS cache according to the IP address and the domain name of the target server 120, the TTL values $T_{ON}$ and $T_{OFF}$, and a reference count. For example, the entry may include the IP address and the domain name of the target server 120, the TTL values $T_{ON}$ and $T_{OFF}$, and the reference count. Alternatively, the entry may include an expiration time $E_{ON}$ of the entry in the screen-on state and an expiration time $E_{OFF}$ of the entry in the screen-off state instead of the TTL values $T_{ON}$ and $T_{OFF}$. The controller 210 may calculate the expiration time $E_{ON}$ according to the TTL value $T_{ON}$ and calculate the expiration time $E_{OFF}$ according to the TTL value $T_{OFF}$. In step 385, return the result of the DNS query, namely, the IP address of the target server 120, to the application. This result of the DNS query is obtained from the DNS server 130.

Next time when an application needs to query for an IP address of the target server 120, the controller 210 executes the method shown in FIG. 3 again. In step 305, receive the DNS query from the application. In step 310, check whether an entry corresponding to the domain name of the query can be found in the local DNS cache or not. As long as the entry was added into the local DNS cache previously in step 380 and has not expired yet, the entry can be found in the local DNS cache.

Assume the entry is available in the local DNS cache this time. Consequently, the flow proceeds to step 315 to check the current state of the electronic device 110. When the current state is the screen-on state, check whether the current time is later than the expiration time $E_{ON}$ of the entry in the screen-on state or not in step 320. When the current time is later than $E_{ON}$, remove the entry from the local DNS cache in step 345, and then the flow proceeds to steps 350-385 to re-send the DNS query to the DNS server 130 and processes the response. On the other hand, when the current time is not later than $E_{ON}$, the flow proceeds to step 340 to return the result of the DNS query to the application. This result of the DNS query is obtained from the entry in the local DNS cache, which saves a repeated query sent to the DNS server 130 and thus saves power for the electronic device 110.

Return to step 315. When the current state is the screen-off state, check whether the current time is later than the expiration time $E_{OFF}$ of the entry in the screen-off state or not in step 325. When the current time is later than $E_{OFF}$, remove the entry from the local DNS cache in step 345, and then the flow proceeds to steps 350-385. On the other hand, when the current time is not later than $E_{OFF}$, increase the reference count of the entry by one and check whether or not the reference count is larger than a predefined threshold value and the current time is later than the expiration time $E_{ON}$ in step 330. When the entry is added into the local DNS cache in step 380, the initial value of the reference count is 0. When the reference count is larger than the predefined threshold value (for example, 10) and the current time is later than the expiration time $E_{ON}$, remove the entry from the local DNS cache in step 345, and then the flow proceeds to steps 350-385.

Otherwise, the flow proceeds to step 335 to determine whether to remove the entry from the local DNS cache or not according to the network condition between the electronic device 110 and the IP address of the target server 120. In step 335, check whether or not the IP address of the target server 120 is unreachable from the electronic device 110 after the previous query for the IP address of the target server 120. When the IP address of the target server 120 is unreachable, remove the entry from the local DNS cache in step 345, and then the flow proceeds to steps 350-385. When the IP address of the target server 120 is reachable, the flow proceeds to step 340 to return the result of the DNS query to the application.

The order of steps 330 and 335 may be exchanged in some embodiments of the present invention. Besides, steps 330 and 335 may be omitted in some embodiments of the present invention.

Figure 4:
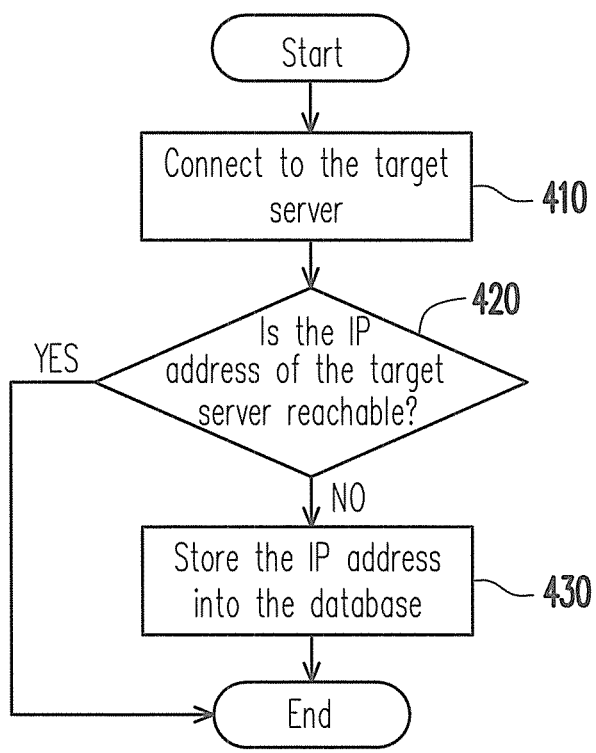

FIG. 4 is a flow chart showing a method for DNS processing according to an embodiment of the present invention. The controller 210 may execute the steps shown in FIG. 4 after obtaining the IP address of the target server 120 by executing the steps shown in FIG. 3. First, in step 410, try to connect to the target server 120. In step 420, check whether the IP address of the target server 120 is reachable or not. The flow ends when the IP address of the target server 120 is reachable. Otherwise, store the IP address of the target server 120 into a database in step 430. The database is used to store IP addresses of unreachable servers. The database may be stored in the storage device 220. In step 335 in FIG. 3, the controller 210 may look up the IP address in the database to check whether the IP address is reachable or not. The IP address is regarded as unreachable in step 335 when the IP address can be found in the database.

In step 420, the controller 210 may regards the IP address as unreachable when the controller 210 sends a network packet to the IP address and does not receive any response to the network packet from the IP address. For example, according to Transmission Control Protocol (TCP), three predefined packets, namely, SYN, SYN-ACK and ACK, are transmitted between two network devices for establishing a TCP connection. The aforementioned network packet may be the SYN packet or the ACK packet. Alternatively, the network packet may be the echo-request packet defined by Internet Control Message Protocol (ICMP). The controller 210 may re-send the network packet to the IP address when the controller 210 sends the previous network packet to the IP address and then does not receive any response from the IP address until a predefined timeout period expires. The controller 210 may regard the IP address as unreachable when the controller 210 has re-sent the network packet for a predefined number of times (for example, 2 times) and the predefined timeout period still expires.

In summary, the aforementioned electronic device and method for DNS processing provide the flexibility to extend the expiration time of DNS cache entries to get results of DNS queries from the local DNS cache more frequently, and to save more power for the electronic device. The electronic device and the method may extend the TTL values only when the screen is turned off, when the electronic device is idle, or when the foreground application does not need network connection so that the extension of TTL values does not affect user experience in the foreground. According to the present invention, the criteria to remove obsolete cache entries and re-send DNS queries are not only based on the TTL values provided by DNS server but also the current operating state of the electronic device and the condition of the network. Therefore, the present invention provides the benefit of power saving for electronic devices, especially for mobile devices, especially for repeated queries with the same domain name.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a Domain Name System (DNS) processing between a DNS server and an electronic device, wherein the electronic device comprises a processor and a local DNS cache, and the method is executed by the processor of the electronic device, comprising:
    receiving a DNS query from an application;
    generating and storing a plurality of time-to-live (TTL) values corresponding to a first entry in the local DNS cache based on a first response which is provided by the DNS server, wherein each of the TTL values respectively corresponds to one of a plurality of operating states of the electronic device;
    identifying a current operating state of the electronic device, wherein the current operating state is one of the plurality of operating states of the electronic device;
    identifying a TTL value corresponding to the identified current operating state of the electronic device, wherein the identified TTL value is one of the plurality of TTL values;
    determining whether to remove the first entry from the local DNS cache in the electronic device or not according to the identified TTL value corresponding to the identified current operating state of the electronic device;
    if the first entry is determined not to be removed, returning a result to the DNS query according to the first entry in the local DNS cache,
    if the first entry is determined to be removed, sending the DNS query to the DNS server;
    receiving a second response to the sent DNS query from the DNS server; and
    adding a second entry into the local DNS cache according to the second response, and returning a result of the DNS query to the application according to the received second response,
    wherein the step of determining whether to remove the first entry from the local DNS cache or not comprises:
        calculating a first expiration time of the first entry in the local DNS cache according to the identified TTL value corresponding to the identified current operating state of the electronic device, wherein the first expiration time of the entry corresponds to the identified current operating state of the electronic device;
        determining whether a current time is later than the first expiration time of the entry; and
        removing the first entry from the local DNS cache if the current time is later than the first expiration time of the entry.

2. The method of claim 1, wherein the step of generating and storing the TTL values corresponding to the first entry in the local DNS cache based on the first response which is provided by the DNS server comprises:
    sending a DNS query for an Internet Protocol (IP) address corresponding to a domain name of a target server to the DNS server, wherein the DNS server provides the first response to the electronic device in response to the DNS query;
    receiving the first response from the DNS server;
    generating and storing the TTL values based on the first response; and
    adding the first entry into the local DNS cache according to the IP address, the domain name, and the TTL values corresponding to the first response.

3. The method of claim 2, wherein the TTL values comprise a first TTL value and a second TTL value, the first response comprises at least one original TTL value, and the step of generating and storing the TTL values based on the first response comprises:
    setting the first TTL value to be a minimum value of the at least one original TTL value; and
    determining the second TTL value based on the first TTL value.

4. The method of claim 3, wherein the step of determining the second TTL value comprises:
    when the first TTL value is smaller than a predefined value, setting the second TTL value to be the predefined value; and
    when the first TTL value is larger than the predefined value, setting the second TTL value to be the first TTL value.

5. The method of claim 1, wherein the operating states at least comprise one of a first state defined by when a screen of the electronic device is turned on, a second state defined by when the screen is turned off, a third state defined by when the electronic device does not receive any user operation in a predefined period of time, and a fourth state defined by when a foreground application executed by the electronic device does not need network connection.

6. The method of claim 1, wherein the first entry comprises an IP address and a reference count that is increased by one whenever the first entry is used to look up the IP address, and the step of determining whether to remove the first entry from the local DNS cache or not further comprises:
determining whether to remove the first entry from the local DNS cache or not according to the reference count and the TTL values.

7. The method of claim 6, wherein the step of determining whether to remove the first entry from the local DNS cache or not further comprises:
removing the first entry from the local DNS cache when the reference count is larger than a predefined threshold value and the current time is not later than the first expiration time and the current time is later than a second expiration time, wherein the second expiration time is calculated according to another TTL value corresponding to another operating state of the electronic device.

8. The method of claim 1, wherein the first entry comprises an IP address and the step of determining whether to remove the first entry from the local DNS cache or not further comprises:
determining whether to remove the first entry from the local DNS cache or not according to a network condition between the electronic device and the IP address.

9. The method of claim 8, wherein the step of determining whether to remove the first entry from the local DNS cache or not further comprises:
removing the first entry from the local DNS cache when the current time is not later than the first expiration time and the IP address is unreachable from the electronic device after a previous query for the IP address.

10. The method of claim 9, wherein the IP address is regarded as unreachable when the processor sends a network packet to the IP address and does not receive any response to the network packet from the IP address.

11. An electronic device for a Domain Name System (DNS) processing between a DNS server and an electronic device, comprising:
a storage device, storing a local DNS cache; and
a controller, coupled to the storage device,
wherein the controller is configured to receive a DNS query from an application,
wherein the controller is configured to generate and store a plurality of time-to-live (TTL) values corresponding to a first entry in the local DNS cache based on a first response which is provided by the DNS server, wherein each of the TTL values respectively corresponds to one of a plurality of operating states of the electronic device,
identify a current operating state of the electronic device, wherein the current operating state is one of the plurality of operating states of the electronic device,
identify a TTL value corresponding to the identified current operating state of the electronic device, wherein the identified TTL value is one of the plurality of TTL values,
wherein the controller is further configured to determine whether to remove the first entry from the local DNS cache or not according to the identified TTL value corresponding to the identified current operating state of the electronic device,
wherein if the first entry is determined not to be removed, the controller is further configured to return a result to the DNS query according to the first entry in the local DNS cache,
wherein if the first entry is determined to be removed from the local DNS cache, the controller is further configured to send the DNS query to the DNS server,
wherein the controller is further configured to receive a response to the sent DNS query from the DNS server,
wherein the controller is further configured to add a second entry into the local DNS cache, and return a result of the DNS query to the application according to the received response,
wherein the in the operation of determining whether to remove the first entry from the local DNS cache or not,
the controller calculates a first expiration time of the first entry in the local DNS cache according to the identified TTL value corresponding to the identified current operating state of the electronic device, wherein the first expiration time of the entry corresponds to the identified current operating state of the electronic device, and
the controller determines whether a current time is later than the first expiration time of the entry,
wherein the controller removes the first entry from the local DNS cache if the current time is later than the first expiration time of the entry.

12. The electronic device of claim 11, wherein the controller sends a DNS query for an Internet Protocol (IP) address corresponding to a domain name of a target server to the DNS server, wherein the DNS server provides the first response to the electronic device in response to the DNS query, receiving the first response from the DNS server, generates and stores the TTL values based on the first response, and adds the first entry into the local DNS cache according to the IP address, the domain name, and the TTL values corresponding to the first response.

13. The electronic device of claim 12, wherein the TTL values comprise a first TTL value and a second TTL value, the first response comprises at least one original TTL value, the controller sets the first TTL value to be a minimum value of the at least one original TTL value, and the controller determines the second TTL value based on the first TTL value.

14. The electronic device of claim 13, wherein when the first TTL value is smaller than a predefined value, the controller sets the second TTL value to be the predefined value; when the first TTL value is larger than the predefined value, the controller sets the second TTL value to be the first TTL value.

15. The electronic device of claim 11, wherein the operating states at least comprise one of a first state defined by when a screen of the electronic device is turned on, a second state defined by when the screen is turned off, a third state defined by when the electronic device does not receive any user operation in a predefined period of time, and a fourth state defined by when a foreground application executed by the electronic device does not need network connection.

16. The electronic device of claim 11, wherein the first entry comprises an IP address and a reference count, the controller increases the reference count by one whenever the controller uses the first entry to look up the IP address, and the controller determines whether to remove the first entry from the local DNS cache or not according to the reference count and the TTL values.

17. The electronic device of claim 16, wherein the controller removes the first entry from the local DNS cache when the reference count is larger than a predefined threshold value and the current time is not later than the first expiration time and the current time is later than a second expiration time, wherein the controller calculates the second expiration time according to another TTL value corresponding to another operating state of the electronic device.

18. The electronic device of claim 11, wherein the first entry comprises an IP address and the controller determines whether to remove the first entry from the local DNS cache or not according to a network condition between the electronic device and the IP address.

19. The electronic device of claim 18, wherein the controller removes the first entry from the local DNS cache when the current time is not later than the first expiration time and the IP address is unreachable from the electronic device after a previous query for the IP address.

20. The electronic device of claim 19, wherein the controller regards the IP address as unreachable when the controller sends a network packet to the IP address and does not receive any response to the network packet from the IP address.

* * * * *